US009832105B2

(12) United States Patent
Burgio et al.

(10) Patent No.: US 9,832,105 B2
(45) Date of Patent: Nov. 28, 2017

(54) METHOD AND APPARATUS FOR IDENTIFYING DIFFERENT ROUTING PATHS BETWEEN NETWORKS

(71) Applicants: Al Burgio, Morgan Hill, CA (US); Joseph B. Gillman, Phoenix, AZ (US); William B. Norton, Palo Alto, CA (US); Thomas Brian Madej, Hamilton (CA)

(72) Inventors: Al Burgio, Morgan Hill, CA (US); Joseph B. Gillman, Phoenix, AZ (US); William B. Norton, Palo Alto, CA (US); Thomas Brian Madej, Hamilton (CA)

(73) Assignee: CONSOLE CONNECT INC., Santa Clara, CA (US)

( * ) Notice: Subject to any disclaimer, the term of this patent is extended or adjusted under 35 U.S.C. 154(b) by 159 days.

(21) Appl. No.: 14/694,869

(22) Filed: Apr. 23, 2015

(65) Prior Publication Data
US 2015/0358228 A1    Dec. 10, 2015

Related U.S. Application Data

(60) Provisional application No. 62/007,565, filed on Jun. 4, 2014.

(51) Int. Cl.
*H04L 12/707* (2013.01)
*H04L 12/751* (2013.01)

(52) U.S. Cl.
CPC .............. *H04L 45/22* (2013.01); *H04L 45/08* (2013.01)

(58) Field of Classification Search
CPC .......... H04L 45/02; H04L 45/08; H04L 45/22
See application file for complete search history.

(56) References Cited

U.S. PATENT DOCUMENTS

| | | | |
|---|---|---|---|
| 2003/0133443 A1 | 7/2003 | Klinker et al. | |
| 2005/0041795 A1 | 2/2005 | Goldstein et al. | |
| 2005/0201302 A1 | 9/2005 | Gaddis et al. | |
| 2007/0064715 A1* | 3/2007 | Lloyd | H04L 12/2602 370/401 |
| 2009/0016236 A1* | 1/2009 | Alcala | H04L 43/022 370/253 |
| 2009/0049201 A1 | 2/2009 | Albert et al. | |
| 2009/0262741 A1* | 10/2009 | Jungck | H04L 29/12066 370/392 |
| 2011/0128969 A1* | 6/2011 | Scholl | H04L 45/00 370/411 |

(Continued)

FOREIGN PATENT DOCUMENTS

CA    WO 2014059550 A1 *    4/2014    .......... H04L 49/557

*Primary Examiner* — Paul H Masur
(74) *Attorney, Agent, or Firm* — David R. Stevens; Stevens Law Group

(57) ABSTRACT

A method and apparatus for analyzing IP data flows for the determination of an alternate routing path for network traffic between a known first network and a destination within an unknown second network on the Internet. An initial path between the first network and the destination exists. The IP address of the destination is determined and looked up in an Internet database. An alternative route to the destination is determined based on information from the Internet database in order to avoid an interconnecting transit network.

20 Claims, 6 Drawing Sheets

(56) References Cited

U.S. PATENT DOCUMENTS

| | | | |
|---|---|---|---|
| 2011/0142054 A1* | 6/2011 | Scholl | H04L 45/02 370/395.31 |
| 2012/0307684 A1 | 12/2012 | Biswas et al. | |
| 2014/0146664 A1 | 5/2014 | Amante | |
| 2015/0023173 A1* | 1/2015 | Sharma | H04L 45/22 370/236 |
| 2015/0256408 A1* | 9/2015 | Burgio | H04L 49/557 726/8 |
| 2015/0326476 A1* | 11/2015 | Ye | H04L 45/745 370/235 |

* cited by examiner

METHOD AND APPARATUS FOR IDENTIFYING DIFFERENT ROUTING PATHS BETWEEN NETWORKS

RELATED APPLICATIONS

This application claims the benefit of U.S. Provisional Application Ser. No. 62/007,565 filed Jun. 4, 2014, which is hereby incorporated herein by reference in its entirety for all purposes.

TECHNICAL FIELD

The present disclosure relates to computer networking and communications networks. More particularly, the present disclosure relates to wide area computer networking and wide area communications networks.

BACKGROUND

Network operators interconnect their autonomous system networks (ASNs) through some mix of Internet transit relationships, where a fee is paid for a network to carry traffic, and peering relationships, where fees are substantially avoided, forming the Internet. Turning to FIG. 1A, Internet traffic can flow by various methods. Traffic originating at a source autonomous network or first network 100 can access resources of a destination within a destination autonomous system network or a second network 118 via several methods.

First, the first network 100 can send traffic originating from its source router 102 via a network communications link 104 to a first transit provider autonomous systems network ("first transit provider") 106. The first transit provider 106 would then direct said traffic via a series of internal or external routers 108, 112 that are connected to one another via one or more network communications links 110 at the discretion of the first transit provider 106. The traffic is then sent directly to the destination router 116 of the second network 118 via a network communications link 114. Furthermore and at the discretion of the first transit provider 106, traffic could also be directed via network communications link 136 to one or more additional transit providers in series 138, 140, 142, 144 via their respective network communication links 146, 148, 150, in which such traffic is controlled at the discretion of the first transit provider 106 before reaching the destination router 116 within the second network 118 via network communications link 152.

Second, the first network 100 can direct traffic through an intermediate Internet Exchange Point (IXP). An IXP is a physical infrastructure through which Internet Service Providers (ISPs), Content Delivery Networks (CDNs) and Enterprise networks exchange traffic between their autonomous system networks. The primary purpose of the IXP is to allow autonomous system networks to interconnect directly, via the IXP, rather than through one or more third-party networks. The advantages of directing traffic through an intermediate IXP interconnection are numerous and include improvements in cost savings, latency, bandwidth and routing control.

A typical IXP includes one or more Ethernet-based local area network (LAN) switches housed in a single location or interconnected across multiple locations. The IXP operates in a layer-2 configuration and utilizes an IP subnet for the connection of participating autonomous system networks. While these very design choices have made the traditional IXPs useful, the IXPs are centralized in their uses or applications.

The second method of accessing resources of the second network 118 is also shown in FIG. 1A. The known first network 100 can direct traffic from the source router 102 over a network communications link 120 to an IXP 122. The IXP 122 directs the traffic through the IXP switch fabric 124 to the network communications link 126 and to the destination router 116 of the second network 118.

Finally, the known first network 100 can establish a private interconnection network communications link 134 directly with the second network 118 for the purpose of sending traffic between them, as also shown in FIG. 1A.

SUMMARY

In a first aspect, the present disclosure may provide a computer-implemented method for identifying alternate routing paths for network traffic between a known first network and a destination within an unknown second network on the Internet. The network traffic between the first network and the destination within the unknown second network may have an initial routing path that crosses at least one interconnecting transit network. The method may comprise obtaining, at a processor of a computer, destination IP address information for the destination within the unknown second network. The processor may compare the destination IP address information to an Internet database to determine an identity of the second network. The processor may further, using the identity of the second network, identify a second routing path comprising a peer connection between the first network and the second network. The peer connection and the second routing path may differ from the initial routing path and may bypass the at least one interconnecting transit network.

The peer connection may be across a distributed Internet exchange platform (DIXP), across an Internet exchange point (IXP), or a direct connection. Additionally, the method may further comprise obtaining, at the processor, source IP address information. In such examples, the processor using the identity of the second network to identify a peer connection between the first network and the second network may further also use the source IP address information to identify the peer connection.

In some examples, the processor using the identity of the second network to identify the peer connection between the first network and the second network bypassing at least one interconnecting transit network may use a network map of interconnections among networks on the Internet to identify the peer connection. In certain examples, the method may further comprise establishing the peer connection between the first network and the second network. Also, in certain examples, the method may further comprise obtaining flow data representing traffic flow patterns between the first network and the second network across at least one interconnecting transit network and extracting the destination IP address information from the flow data. Other aspects and features of the present disclosure will become apparent to those ordinarily skilled in the art upon review of the following description of specific embodiments in conjunction with the accompanying figures.

BRIEF DESCRIPTION OF THE DRAWINGS

These and other features of the invention will become more apparent from the following description in which reference is made to the appended drawings wherein.

DETAILED DESCRIPTION

It will be readily understood that the components of the present invention, as generally described and illustrated in the figures herein, can be arranged and designed in a wide variety of different configurations. Thus, the following more detailed description, as represented in the figures, is not intended to be limiting in scope, as claimed, but is merely representative of certain examples. The presently described examples will be best understood by reference to the drawings, wherein like parts are designated by like numerals throughout.

Generally, the present disclosure provides a method and system for determining the analytics around routing and flow metrics to assist in determining whether to join an Internet exchange platform (IXP), a distributed Internet exchange platform (DIXP), or engage in simple private interconnection as an alternative to a traffic flow path that crosses one or more interconnecting transit networks. It is to be appreciated that as used herein, the term "interconnecting transit network" refers to transit provider autonomous systems networks, or ASNs, as described above, and does not include an IXP, a DIXP or simple private interconnection. A DIXP is a service provider network directly interconnecting at least some of the available IXPs globally (Network of IXPs) and consists of a set of related services as described in WIPO patent publication number WO2014/059550, the teachings of which are hereby incorporated by reference.

Identifying and analyzing the dominant traffic flow patterns enables network operators to identify other interconnected networks for Internet transit and peering. Collecting network traffic data can be accomplished by periodically collecting flow data from network routers, switches or other computer network devices ("Network Device"), either by using data sampled and delivered by Netflow (RFC 3954), sflow (RFC 3176), cflowd (RFC 3954), jflow (a proprietary protocol supported by Juniper Networks) or other similar protocol (each referred to individually as a "Flow Protocol"), or by analyzing the raw traffic data delivered over such network device port by a port mirror or network tap to provide information including the source and destination Internet Protocol (IP) address tuples and associated traffic flow, including routing direction, next hop on the route and volume ("Flow Data").

Figure 1A:
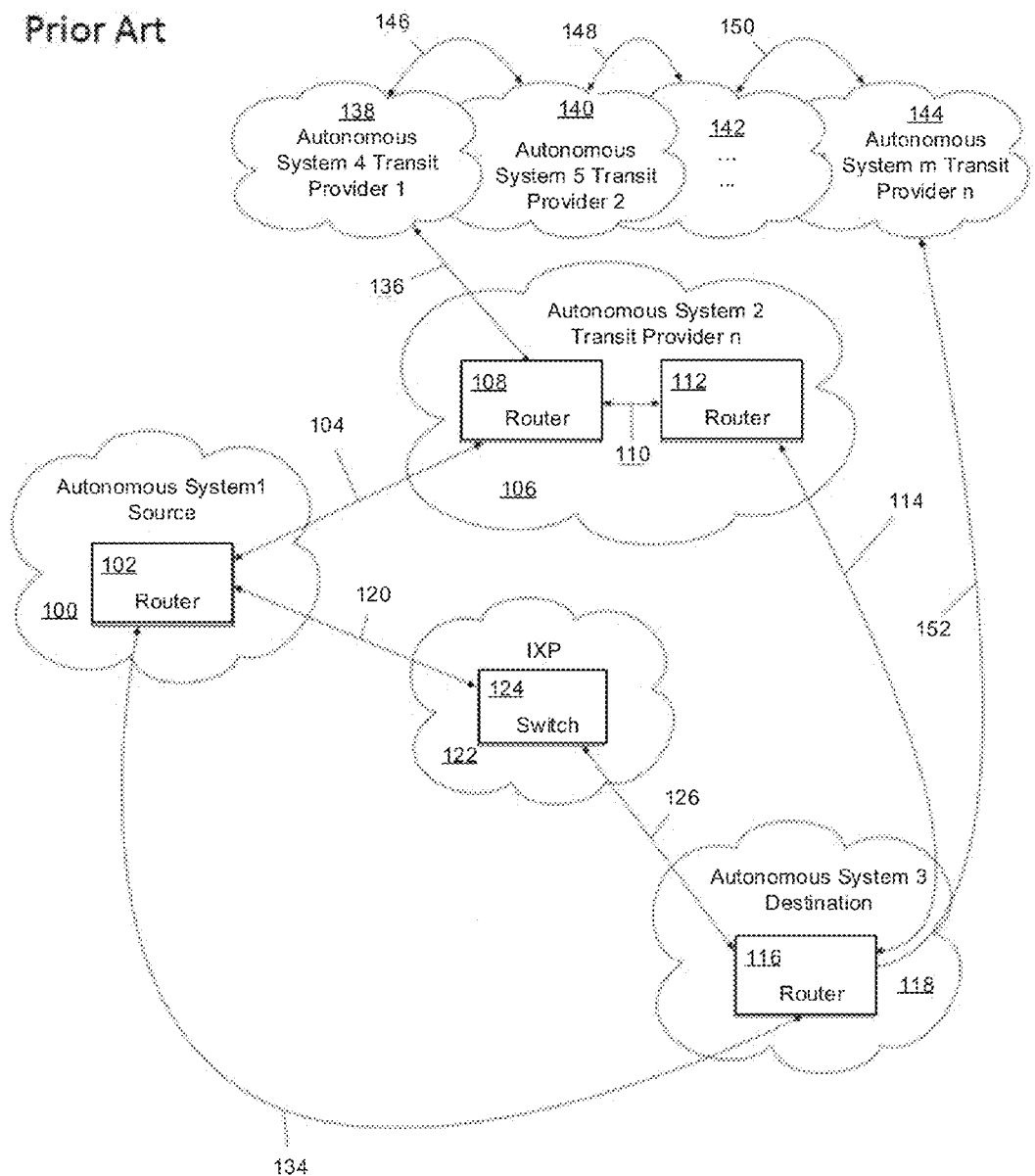
FIG. 1A illustrates methods known in the prior art of traffic originating at a first known network accessing resources of a destination within a second network.
Figure 1B:
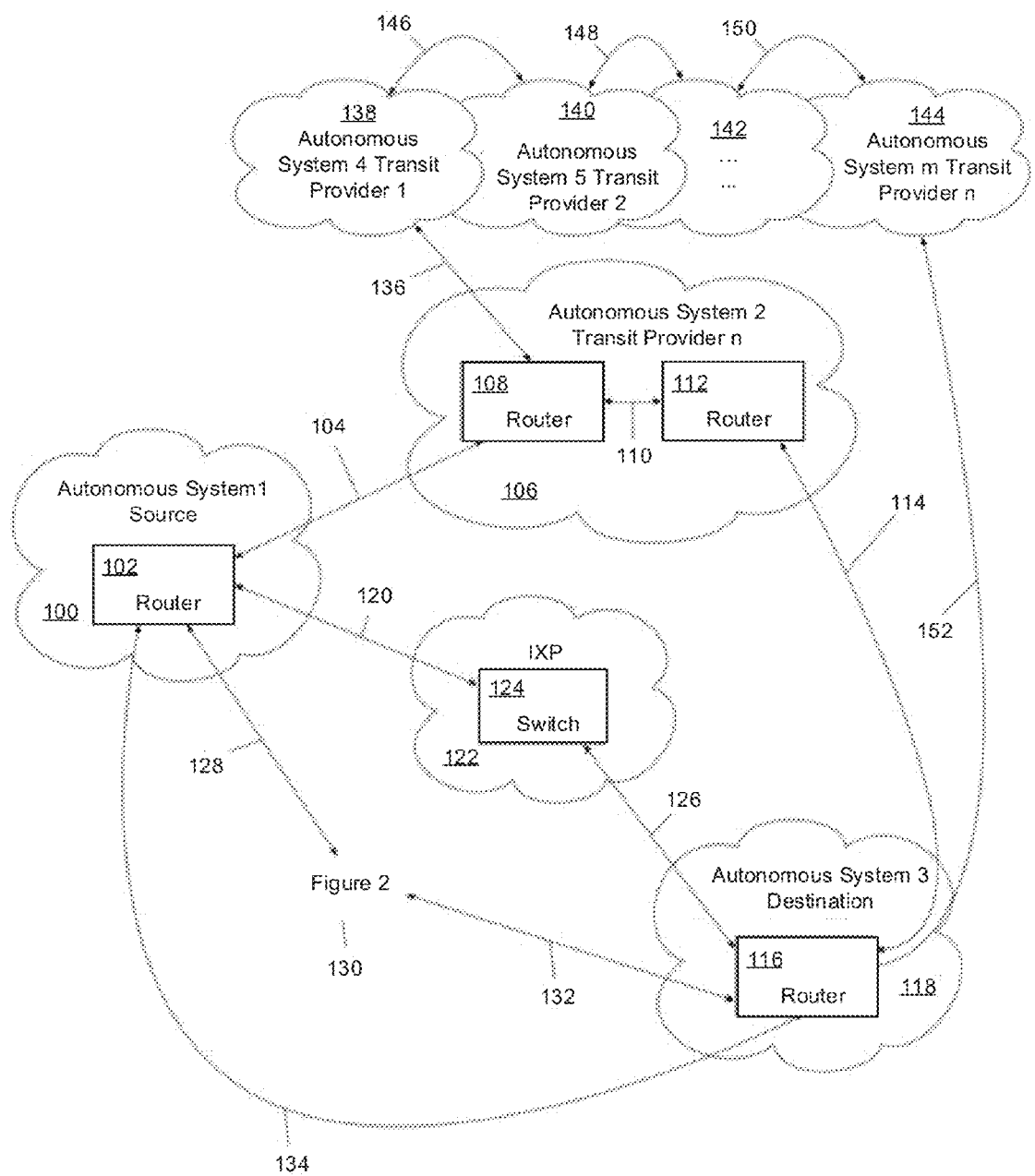
FIG. 1B illustrates an exemplary method for Internet traffic flow in which the first known network directs traffic through a distributed internet exchange platform (DIXP)

FIG. 1B shows an exemplary method for Internet traffic flow in which traffic flows from a first network 100 through a physical infrastructure 130 operable to provide a peer connection between the first network 100, which may be an autonomous system network (ASN), and a second network, which may also be an ASN. Examples of such physical infrastructure 130 may include, without limitation, a DIXP, an IXP, and/or a private connection. The peer connection may be provided over a routing path through the physical infrastructure that differs from an initial routing path between the first network and the second network. In such examples, the initial path may have traversed one or more interconnecting transit networks 106, 138, 140, 142, 144, as in the first scenario described above with respect to FIG. 1A.

Figure 2:
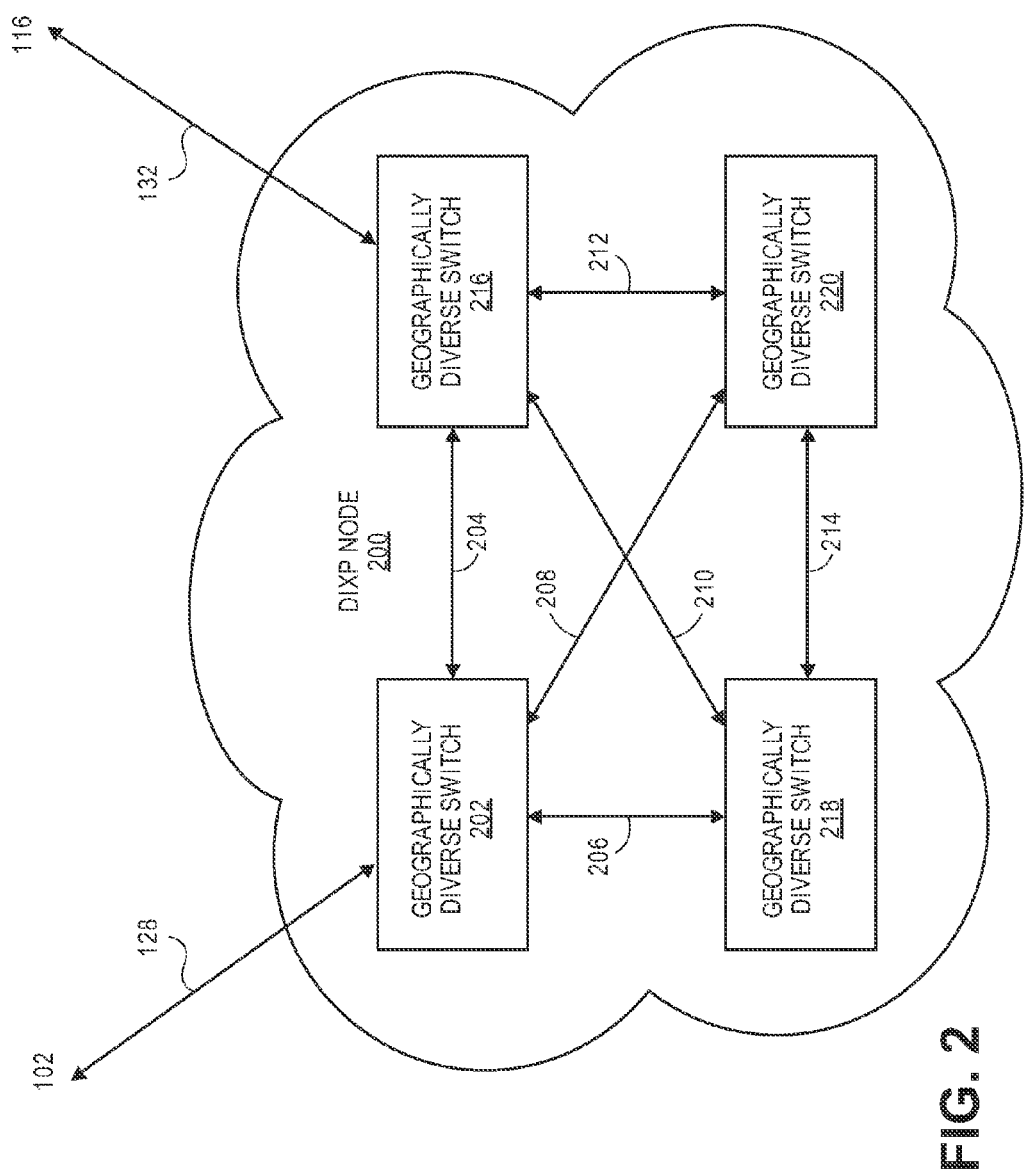
FIG. 2 illustrates the details of an exemplary DIXP of FIG. 1B.

With reference to FIG. 1B and FIG. 2, the first network 100 can send traffic through network communications link 128 into the DIXP 200. The DIXP can then send the traffic through the switch fabric amongst its geographically diverse switches 202, 216, 218, 220 via network communication links 204, 206, 208, 210, 212, 214. The DIXP can direct traffic via the geographically diverse switches 202, 216, 218, 220 using various algorithms, standards and/or protocols, including but not limited to: Shortest Path Bridging (SPB), as defined by IEEE 802.1aq; Transparent Interconnection of Lots of Links (TRILL); Spanning Tree Protocol (STP), as defined by IEEE 802.1D or other such layer 2 protocols. The traffic is sent to the destination router 116 within the second network 118 via the network communications link 132.

Figure 3:
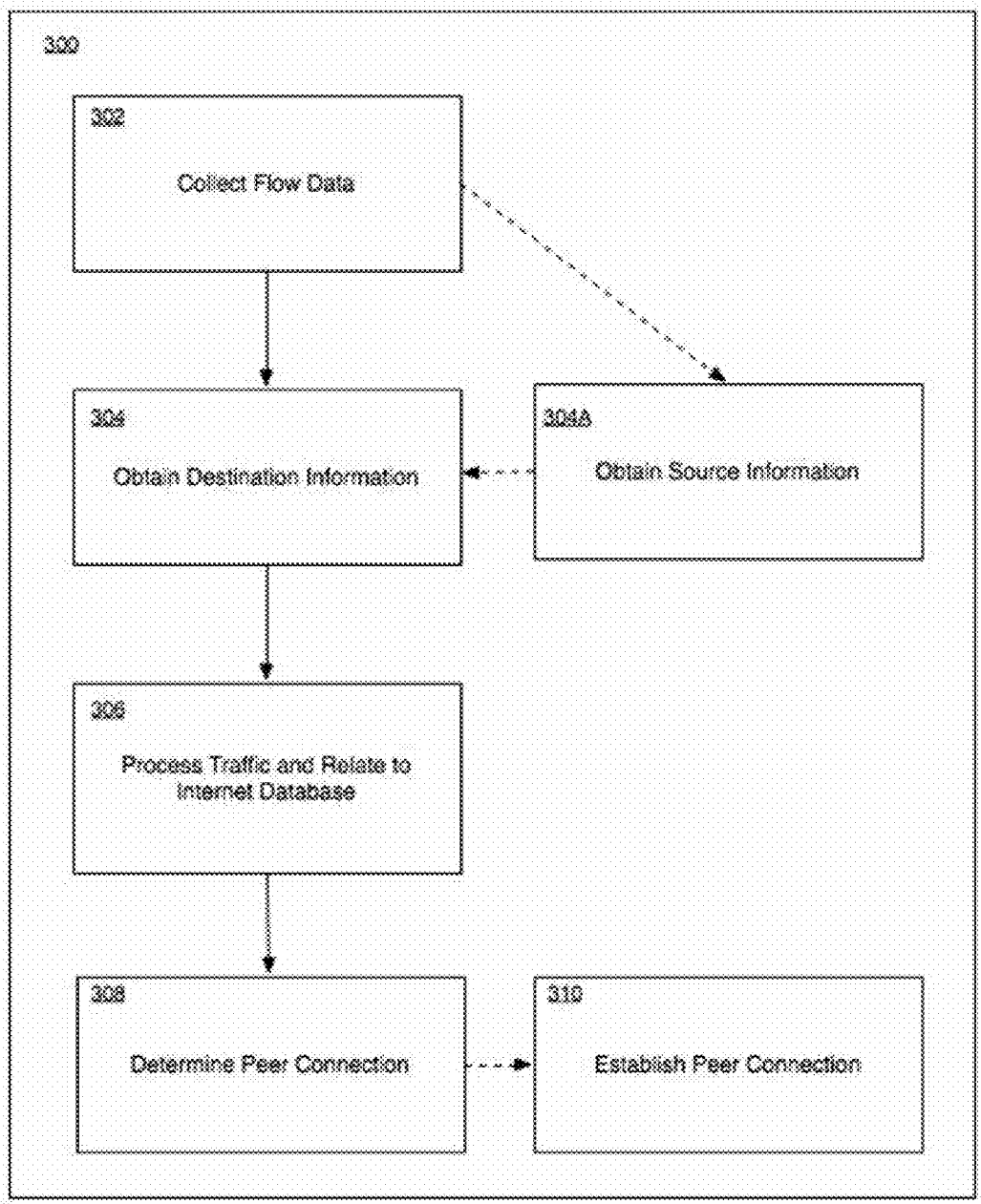
FIG. 3 is a flow chart illustrating an exemplary computer-implemented method for identifying alternate routing paths for network traffic between a known first network and a destination within an unknown second network on the Internet.
Figure 4:
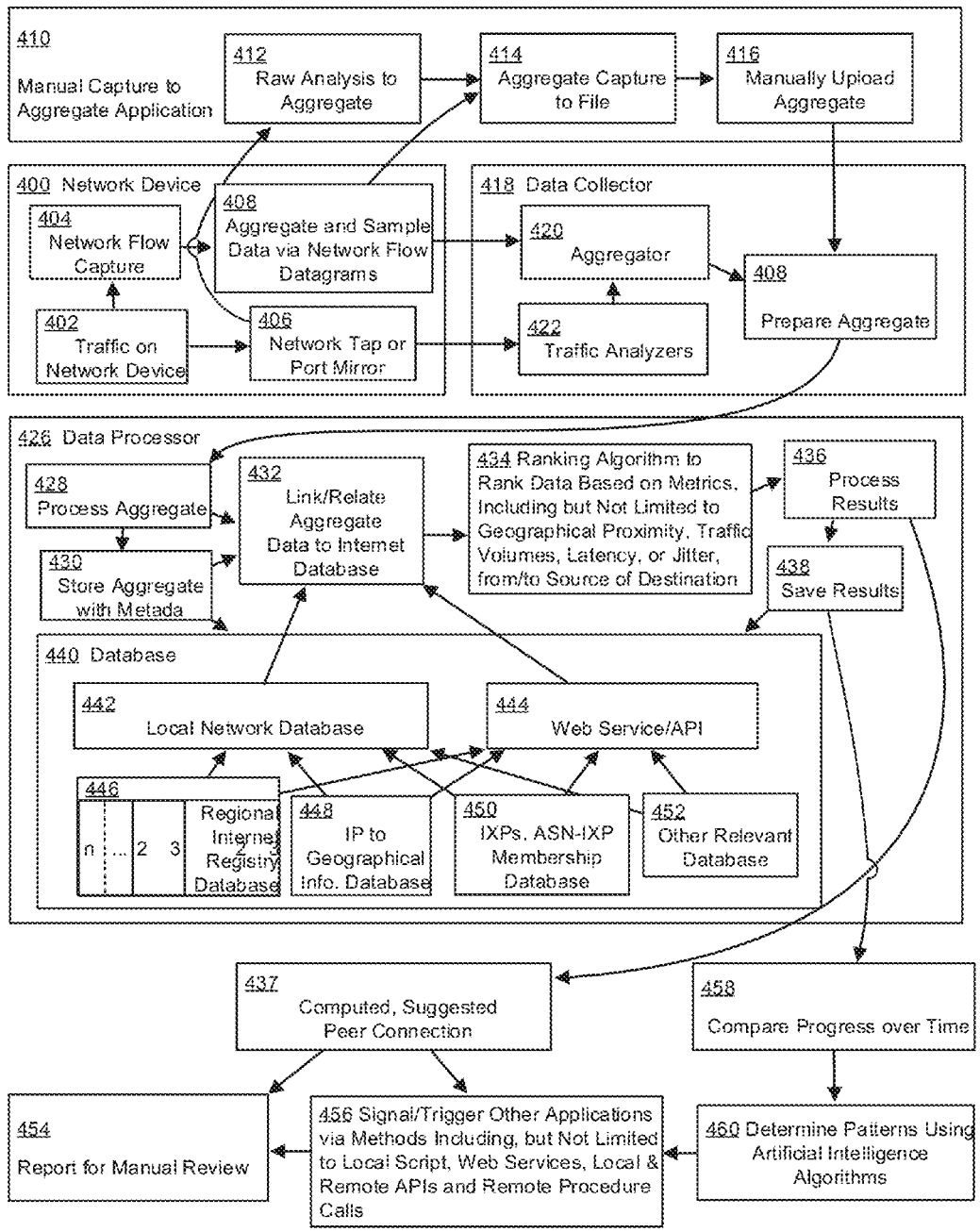
FIG. 4 is a flow chart of an exemplary arrangement for collecting network analytics in support of the exemplary computer-implemented method of FIG. 3.

Reference is now made to FIG. 3, which is a flow chart illustrating an exemplary computer-implemented method 300 for identifying alternate routing paths for network traffic between a known first network and a destination within an unknown or unidentified second network on the Internet. The flowcharts in FIG. 3 and FIG. 4 illustrate the architecture, functionality, and/or operation of possible implementations of systems, methods, and computer program products according to examples. In this regard, each block in the flowcharts may represent a module, segment, or portion of code, which comprises one or more executable instructions for implementing the specified logical function(s). It will also be noted that each block of the flowchart illustrations, and combinations of blocks in the flowchart illustrations, may be implemented by special purpose hardware-based systems that perform the specified functions or acts, or combinations of special purpose hardware and computer instructions.

Where computer program instructions are involved, these instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block or blocks. These computer program instructions may also be stored in a computer readable medium that may direct a computer to function in a particular manner, such that the instructions stored in the computer-readable medium produce an article of manufacture including instruction means which implement the function/act specified in the flowchart and/or block or blocks. The computer program may also be loaded onto a computer to cause a series of operation steps to be performed on the computer or other programmable apparatus to produce a computer implemented process for the functions/acts specified in the flowchart and/or block or blocks.

It should also be noted that, in some alternative implementations, the functions noted in the blocks may occur out of the order noted. In certain embodiments, two blocks shown in succession may, in fact, be executed substantially concurrently, or the blocks may sometimes be executed in the reverse order, depending upon the functionality involved. Alternatively, certain steps or functions may be omitted.

The method 300 depicted in FIG. 3 is a computer-implemented method carried out by one or more computer systems, potentially by one or more modules residing at the one or more computer systems and/or elsewhere in a system in which the computer system(s) play a role, in particular by the processor(s) thereof, with the processors controlling ancillary hardware. As used herein, the term "processor" may include multiple processing devices operating in cooperation as a processing unit. Modules may take the form of an entirely hardware embodiment, an entirely software embodiment (including firmware, resident software, microcode, etc.), or an embodiment combining software and hardware aspects. Furthermore, aspects of the presently discussed subject matter may take the form of a computer program product embodied in any tangible medium of expression having computer-usable program code.

With respect to software aspects, any combination of one or more computer-usable or computer-readable media may be utilized. For example, a computer-readable medium may include one or more of a portable computer diskette, a hard disk, a Random Access Memory (RAM) device, a Read-Only Memory (ROM) device, an Erasable Programmable Read-Only Memory (EPROM or Flash memory) device, a portable Compact Disc Read-Only Memory (CDROM), an optical storage device, and a magnetic storage device. In selected embodiments, a computer-readable medium may comprise any non-transitory medium that may contain, store, communicate, propagate, or transport the program for use by or in connection with the instruction execution system, apparatus, or device.

Computer program code for carrying out operations of the present invention may be written in any combination of one or more programming languages, including an object-oriented programming language such as C++, and conventional procedural programming languages, such as the "C" programming language, or similar programming languages. Aspects of a module that are implemented with software may be executed on a micro-processor, Central Processing Unit (CPU) and/or the like. Any hardware aspects of the module may be implemented to interact with software aspects.

In the method 300 shown in FIG. 3, an initial routing path for the network traffic between the first network 100 and the destination within the unknown second network 118 crosses at least one interconnecting transit network (e.g. transit provider autonomous systems networks 106, 138, 140, 142, 144 in FIGS. 1A and 1B). However, there may be alternate routing paths which bypass the interconnecting transit network(s) by using a peer connection, such as one or more IXPs, one or more DIXPs or one or more private interconnections. Such alternate routing paths may be advantageous relative to the initial routing path. For example, the use of a peer connection instead of one or more interconnecting transit networks can reduce latency and jitter, and may avoid the transit fees associated with the interconnecting transit network(s). However, because the second network 118 (i.e. the network that contains the destination) is unknown, alternate routing paths via peer connection may not be apparent.

At step 302, the method 300 may obtain, at a processor of a computer, destination IP address information for the destination within the unknown second network. It may do so by obtaining flow data representing traffic flow patterns between the first network and the second network across the interconnecting transit network(s), and extracting the destination IP address information for the destination within the unknown second network from the flow data, thereby obtaining the destination IP address at step 304. In some embodiments, this functionality may be performed by a collection module residing at one or more computers.

At optional step 304A, with arrows shown in dashed lines, the method 300 may also extract source IP address information from the flow data. In some embodiments, this functionality may be performed by a processing module residing at one or more computers. Steps 302 and 304 (and 304A, when present) may be performed by the same computer system, or a first computer system may extract the destination IP address information (and source IP address information) from the flow data at step 302 and pass it to a second computer system, which receives it at step 304 (and 304A).

At step 306, the processor compares the destination IP address information to one or more databases, such as an Internet database, to determine the identity of the unknown second network. Such databases may be operable to maintain destination internet protocol (IP) addresses correlated to a set of networks and/or routing information for the set of networks. This functionality may also be performed by a processing module residing at one or more computers.

Once the identity of the unidentified second network is determined, the method 300 at step 308 may use the identity of the second network to identify a peer connection, which may also be determined by the processing module, between the first network and the second network, for example by using a network map of interconnections among networks on the Internet. The peer connection identified at step 308 may bypass the interconnecting transit network(s), and may be, for example, a peer connection across a DIXP, a peer connection across an IXP, or a direct connection. Where step 304A is present, step 308 may also use the source IP address information to identify the peer connection, and may use additional information as well.

In examples including the processing module, the processing module may be communicatively coupled to the database(s) and may have a processor, memory unit, and executable code. The processing module may be operable to receive a destination IP address for network traffic and compare the destination IP address to information in the database(s) to determine an identity of the second network. Additionally, the processing module may determine the routing path to the second network based on the identity of the second network and the routing information.

At optional step 310, shown in dashed lines, the method 300 may establish, potentially by an implementation module, the peer connection between the first network and the second network. Alternatively, the peer connection may be established manually. In examples including the implementation module, the implementation module may reside with the physical infrastructure over which the peer connection is implemented and/or the one or more computers. Additionally, the implementation module may be communicatively coupled to the processing module and/or the physical infrastructure. The implementation module may be operable to receive the routing path from the processing module and to establish the peer connection implementing the routing path between the first network and the second network via the physical infrastructure.

FIG. 4 is a logical flow diagram of an exemplary arrangement for collecting network analytics to support the method 300 described above; for convenience the exemplary arrangement is referred to herein as a "Network Flow Finder System". In one presently preferred embodiment, the Network Flow Finder System comprises the source equipment 400 (for example, a router or a switch), a data collector 418, or collection module 418, a manual aggregate capture application 410, a database 440 containing information related to the operations of the internet (Internet database 440), including registry and geographical information and a data processor 426, or processing module 426, resulting in various outputs, including a report for manual review as well as automated triggers both based on results as well as statistical analysis of those statistics over time to notify third party systems of the changes.

In more detail, as shown in FIG. 4, the process may begin with data collection from one or more network devices 400. For example, two or more methods may be used to obtain data from the network device: capture via flow protocol 404 or via network tap/port mirror 406. In either case, the network device 400 can either provide raw data or aggregated information and sampled data, including flow protocol datagrams to either the data collector/collection module 418 and/or the manual capture to aggregate application 410.

Furthermore, as shown in FIG. 4, the manual capture to aggregate application 410 allows users to obtain traffic information without having a direct connection to the data collector/collection module 418 or the proceeding processes covered in the disclosure. For privacy and security purposes, if the user elects to utilize this manual capture to aggregate application 410, the application may remove identifying information of the data transferred resulting in an identifier for the autonomous system network, the percentage of traffic transferred to that network and other relevant aggregate counters. Depending on the level of information removed, it may effectively remove proprietary or confidential information.

When data arrives in the raw analysis to aggregate process 412 as raw data from the network tap/port mirror 406, the data may be analyzed, aggregated progressively, and passed to an aggregate capture to file process 414. From there, the aggregate capture to file process 414 may save the aggregate information as a file on the machine on which the application is running as a tabular data format in either human readable format, including but not limited to comma/tab separate values (CSV/TSV), extensible markup language (XML), javascript object notation (JSON), as well as computer readable format, including but not limited to binary data in any type of encoding or format or proprietary data formats. At this point the user can elect to upload 416 said data to the data collector 418 for further processing. In some example, the collection module may further comprise an application programming interface (API) 444. Such an API 444 may be configured to enable flow data, such as in a file, to be uploaded to the collection module from a user of the system.

Now referring to the data collector/collection module 418 in FIG. 4, it is shown that the data collector/collection module 418 can receive data about traffic flowing through the network equipment both via the aggregate and sample data via flow protocol datagrams 408 as well as via raw network traffic using a network tap/port mirror 406. In the case of receiving raw data via the network tap/port mirror 406, the traffic may be forwarded to the data collector 418 then on to the traffic analyzer 422 that captures the data in real time to create flow protocol-like datagrams and passes them along to the aggregator 420. In the case of aggregate and sample data via network datagrams 408, the datagrams may be forwarded to the data collector/collection module 418 and onto the aggregator 420 to combine the data. Once the aggregator 420 has completed its capture of data, it prepares the aggregate data 424 to be sent to the data processor/processing module 426 either through internal communication or via web services call to the data processor/processing module 426.

Furthermore, the data processor/processing module 426 in FIG. 4 may be the analysis process that assimilates the aggregate data 428 and links/relates 432 the aggregate data to the Internet database 440 to identify key potential autonomous system networks that would yield performance, cost savings or other metric-based goals. Aggregate data passed from the data collector/collection module 418 to the data processor/processing module 426 may be processed with the option of storing the aggregate data along with metadata 430 within the Internet database 440 for purposes including but not limited to improving future analysis, monitoring progress over time 458 and utilizing artificial intelligence (AI) algorithms, which may be applied by an AI module 460, to improve predictability.

In examples where the processing module 426 further comprises an AI module 460, the AI module 460 may be communicatively coupled to the collection module 418 and/or the database(s) 440. Such an AI module 460 may be operable to receive flow data from the collection module. Additionally, the AI module 460 may generate the routing information for the set of networks by applying one or more AI algorithms to the flow data and provision the routing information to the database 440.

The aggregate data may be linked/related 432 to the database 440, which may include a variety of databases, including the various regional Internet registry databases 446, the IP address to geographical information databases 448, IXPs, ASN-IXP membership databases 450 and/or other relevant databases 452. These databases 440 may be accessed from a local network database 442. Third party databases may be accessible via a web service interface or application programming interface (API) 444. The aggregate data and or peer connection in the routing information may then be ranked based on metrics, such as by a ranking module 434, including but not limited to geographical proximity, traffic volumes, latency or jitter and from/to the source or first network and the destination or second network. The results may be processed 436 with the option of saving them for future use 438 as described above. By doing so, this process may identify potential destination ASNs for direct interconnection via the DIXP and the amount of traffic that could be directly exchanged across the DIXP with said ASNs.

The result from the data processor/processing module 426, as shown in FIG. 4, may include computed suggested peer connections 437, provided by a suggestion module 437. The benefits of the computed, suggested peer connections 437 are outlined above. The information in the computed suggested peer connections 437 can be delivered in a variety of ways including a report for manual review 454, a signal/trigger to other applications via methods including, but not limited to, local script, web services, local & remote APIs and remote procedure calls 456, or compared over time 458 to determine patterns over time using artificial intelligence algorithms 460 to signal/trigger other applications 456 as described above. The report and trigger information provides the level of abstraction needed to easily identify where services and applications are currently delivered for its customers and end users, and how they might be better delivered via specific destination ASNs across the DIXP. Prospective DIXP customers can then determine the desired mix of available destination ASNs for direct (physical or virtual) interconnection, Internet transit providers and interconnection locations available across the DIXP, providing a quantifiable assessment of the incremental value derived by using the DIXP.

Figure 5:
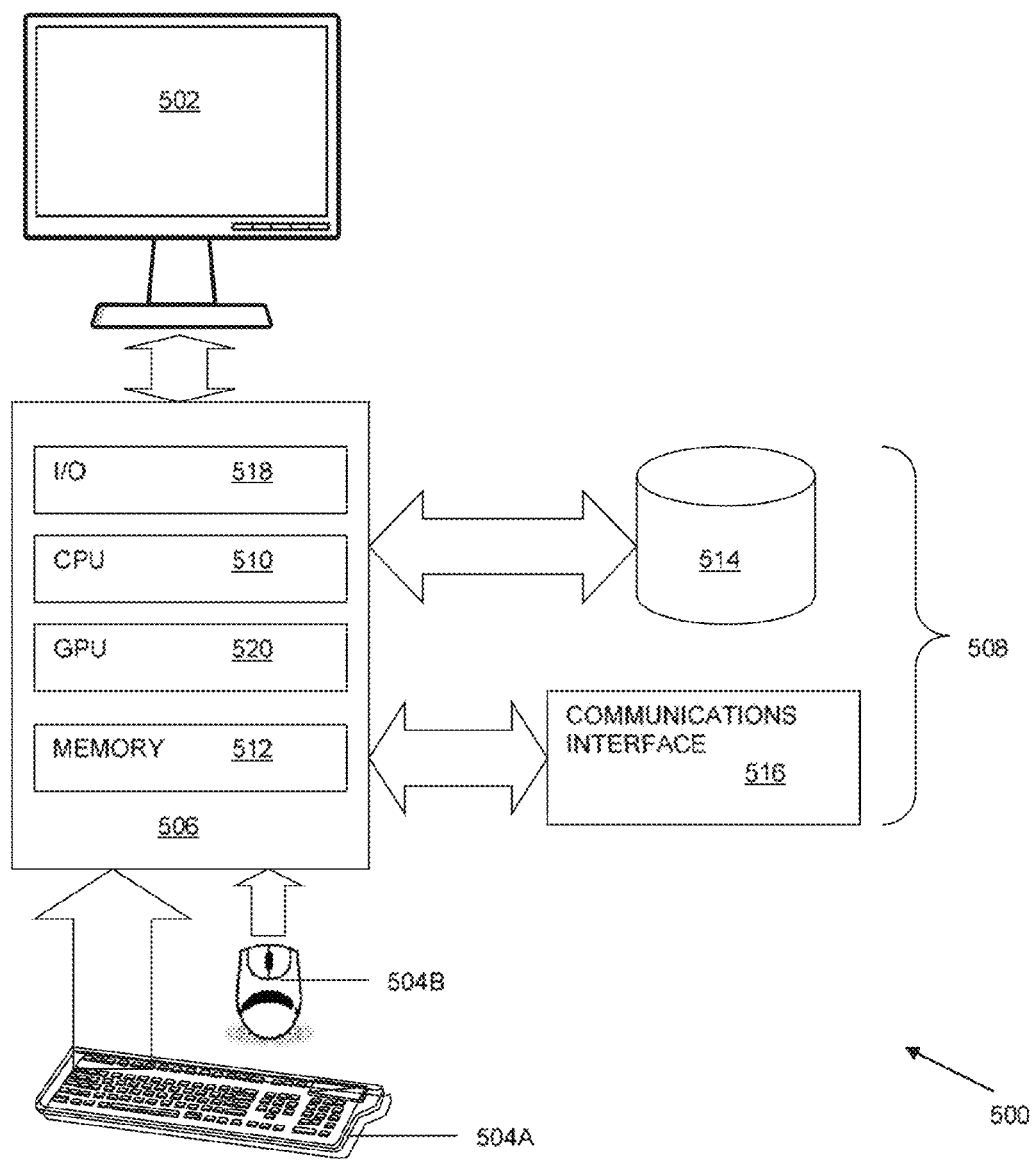
FIG. 5 is a block diagram of a computer system in respect of which the exemplary methods herein described may be implemented.

An illustrative computer system in respect of which the methods herein described may be implemented is presented as a block diagram in FIG. 5. The illustrative computer system is denoted generally by reference numeral 500 and may include a display 502, input devices in the form of keyboard 504A and/or pointing device 504B, computer 506 and/or external devices 508. While pointing device 504B is depicted as a mouse, it will be appreciated that other types of pointing device may also be used.

The computer 506 may contain one or more processors or microprocessors, such as a central processing unit (CPU) 510. The CPU 510 may performs arithmetic calculations and control functions to execute software stored in an internal memory 512, preferably random access memory (RAM) and/or read only memory (ROM), and possibly additional memory 514. The additional memory 514 may include, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory 514 may be physically internal to the computer 506, or external as shown in FIG. 5, or both.

The computer system 500 may also include other similar means for allowing computer programs or other instructions to be loaded. Such means can include, for example, a communications interface 516 which allows software and data to be transferred between the computer system 500 and external systems and networks. Examples of communications interface 516 can include a modem, a network interface such as an Ethernet card, a wireless communication interface, or a serial or parallel communications port. Software and data transferred via communications interface 516 are in the form of signals which can be electronic, acoustic, electromagnetic, optical or other signals capable of being received by communications interface 516. Multiple interfaces, of course, can be provided on a single computer system 500.

Input and output to and from the computer 506 may be administered by the input/output (I/O) interface 518. This I/O interface 518 administers control of the display 502, keyboard 504A, external devices 508 and/or other such components of the computer system 500. The computer 506 may also include a graphical processing unit (GPU) 520. The latter may also be used for computational purposes as an adjunct to, or instead of, the (CPU) 510, for mathematical calculations. The various components of the computer system 500 are coupled to one another either directly or by coupling to suitable buses.

The above-described embodiments are intended to be examples only. The present disclosures may be embodied in other specific forms without departing from their spirit or essential characteristics. The described examples are to be considered in all respects only as illustrative, not restrictive. The scope of the invention is, therefore, indicated by the appended claims, rather than by the foregoing description. All changes within the meaning and range of equivalency of the claims are to be embraced within their scope. The scope of the claims should not be limited by the preferred embodiments set forth in the examples, but should be given the broadest interpretation consistent with the description as a whole.

The invention claimed is:

1. A computer-implemented method for identifying alternate routing paths for network traffic between a known first network and a destination within an unknown second network on the Internet, the method comprising:
   collecting, by a processor of a computer, network traffic data from one or more network devices by way of at least one of a network tap and a port mirror;
   determining, by the processor, an initial routing path from the network traffic data, the initial routing path between the first network and the destination within the unknown second network crosses at least one interconnecting transit network;
the method further comprising:
   a. obtaining, at the processor, destination IP address information for the destination within the unknown second network from the network traffic data;
   b. the processor linking the network traffic data to a third-party Internet database to determine an identity of the second network; and
   c. the processor using the identity of the second network to identify a second routing path comprising a peer connection between the first network and the second network wherein the peer connection and the second routing path differs from the initial routing path and bypasses the at least one interconnecting transit network.

2. The method of claim 1, wherein the peer connection is across a distributed Internet exchange platform (DIXP).

3. The method of claim 1, wherein the peer connection is across an Internet exchange point (IXP).

4. The method of claim 1, wherein the peer connection is a direct connection.

5. The method of claim 1, further comprising:
   obtaining, at the processor, source IP address information; and
   using the source IP address information to identify the peer connection.

6. The method of claim 1, further comprising the processor using a network map of interconnections among networks on the Internet to identify the second routing path comprising the peer connection.

7. The method of claim 1, further comprising:
   establishing the peer connection between the first network and the second network.

8. The method of claim 1, further comprising:
   obtaining flow data representing traffic flow patterns between the first network and the second network across at least one interconnecting transit network; and
   extracting the destination IP address information from the flow data.

9. A system for identifying different routing paths for autonomous networks, comprising:
   a. physical infrastructure operable to provide a peer connection between a first autonomous network (AN) and a second AN over a routing path that differs from an initial routing path between the first AN and the second AN, the initial path traversing at least one interconnecting transit network;
   b. at least one database operable to maintain destination internet protocol (IP) addresses correlated to a set of ANs and routing information for the set of ANs;

c. a processing module communicatively coupled to the at least one database, having a processor, memory unit, and executable code and operable to:
  i. receive and aggregate network traffic data from one or more network devices;
  ii. link the network traffic to the at least one database;
  iii. receive a destination IP address for network traffic;
  iv. compare the destination IP address to information in the at least one database to determine an identity of the second AN; and
  v. determine the peer connection and routing path to the second AN based on the identity of the second AN and the routing information.

10. The system of claim 9 wherein the processing module further comprises an Artificial Intelligence (AI) module communicatively coupled to the collection module and a database of the at least one database, the AI module operable to:
  a. receive flow data from the collection module;
  b. generate the routing information for the set of ANs by applying an AI algorithm to the flow data;
  c. provision the routing information to the database.

11. The system of claim 10 further programmed to rank peer connections in the routing information, with information from at least one of the flow data and the database, the route information with respect to at least one metric comprising at least one of geographical proximity, traffic volumes, latency and jitter.

12. The system of claim 11 wherein the database further comprises at least one of a Internet registry database, an IP address to geographical information database, and an IXP membership database.

13. The system of claim 9 further comprising a suggestion module further operable to provide at least one of a report for manual review and a signal to other application.

14. The system of claim 9 wherein the physical infrastructure comprises a distributed Internet exchange platform (DIXP).

15. The system of claim 9 wherein the physical infrastructure comprises an Internet exchange point (IXP).

16. The system of claim 9 further programmed to receive the routing path from the processing module and to establish the peer connection implementing the routing path between the first AN and the second AN via the physical infrastructure.

17. The system of claim 9, further comprising a collection module having a network interface card (NIC) and executable code operable to capture flow data and extract the destination IP address for network traffic described by the flow data.

18. The system of claim 17 wherein the collection module may be further operable to capture flow data by at least one of a flow protocol and raw traffic data from at least one of a network tap and a port mirror.

19. The system of claim 18 further comprising a network device operable to implement a flow protocol to sample traffic data delivered by the network device, to generate flow data, and to provide the flow data to the collection module.

20. The system of claim 17 wherein the collection module further comprises an application programming interface (API), the API configured to enable flow data to be uploaded to the collection module from a user of the system.

* * * * *